United States Patent
Tanaka

Patent Number: 5,940,226
Date of Patent: Aug. 17, 1999

[54] LIGHT INTERCEPTING MECHANISM OF A ZOOM LENS BARREL

[75] Inventor: Hitoshi Tanaka, Tokyo, Japan

[73] Assignee: Asahi Kogaku Kogyo Kabushiki Kaisha, Tokyo, Japan

[21] Appl. No.: 08/924,663

[22] Filed: Sep. 5, 1997

[30] Foreign Application Priority Data

Sep. 11, 1996 [JP] Japan .................................. 8-240273
Apr. 10, 1997 [JP] Japan .................................. 9-110402

[51] Int. Cl.⁶ .............................. G02B 7/02; G02B 27/00; G02B 21/00
[52] U.S. Cl. ........................... 359/819; 359/601; 359/611
[58] Field of Search .................................. 359/676, 601, 359/611, 819

[56] References Cited

U.S. PATENT DOCUMENTS

| | | | |
|---|---|---|---|
| 4,002,402 | 1/1977 | Mito | 359/611 |
| 4,911,542 | 3/1990 | Nishio et al. | 359/701 |
| 5,227,825 | 7/1993 | Eguchi et al. | 354/287 |
| 5,294,954 | 3/1994 | Nomura et al. | 354/287 |
| 5,313,329 | 5/1994 | Ueda | 359/676 |
| 5,327,184 | 7/1994 | Nomura et al. | 354/195.1 |
| 5,343,331 | 8/1994 | Kohmoto et al. | 359/823 |
| 5,365,373 | 11/1994 | Tanaka | 359/601 |
| 5,420,656 | 5/1995 | Kohmoto | 354/195.1 |
| 5,450,239 | 9/1995 | Uziie et al. | 359/601 |

FOREIGN PATENT DOCUMENTS 46-33495  10/1971  Japan .

OTHER PUBLICATIONS

English language translation of Japanese Laid-Open Publication No. 46-33495.

Primary Examiner—Georgia Epps
Assistant Examiner—Suzanne Letendre
Attorney, Agent, or Firm—Greenblum & Bernstein, P.L.C.

[57] ABSTRACT

A light intercepting mechanism of a zoom lens barrel includes a movable lens frame which holds a frontmost lens group, and a drive ring which is fitted on an outer peripheral surface of the movable lens frame to relatively rotate, so that when the relative rotation of the drive ring occurs, the movable lens frame is moved in the optical axis direction. The movable lens frame has a dual-cylinder structure having a closed front end and an open rear end. The drive ring has a dual-cylinder structure having a closed rear end and an open front end. The movable lens frame having the dual-cylinder structure and the drive ring having the dual-cylinder structure are fitted one inside the each other.

10 Claims, 7 Drawing Sheets

LIGHT INTERCEPTING MECHANISM OF A ZOOM LENS BARREL

BACKGROUND OF THE INVENTION

1. Field of the Invention

The present invention relates to a light intercepting mechanism of a zoom lens barrel.

2. Description of the Related Art

In a known zoom lens barrel, particularly a zoom lens barrel of a zoom compact camera, a movable lens frame (moveable lens barrel) which holds a frontmost lens group is surrounded by a drive ring (e.g., cam ring) which is relatively rotatable, so that the movable lens barrel is moved in an optical axis direction by a relative rotation of the drive ring.

Generally, in this type of zoom lens barrel, an annular light intercepting member in the form of paper or tape, etc., is attached to the inner peripheral surface of the front end of the drive ring. The annular light intercepting member is brought into sliding contact with the outer peripheral surface of the movable lens frame to thereby prevent extraneous (harmful) light from entering through an annular gap between the movable lens frame and the drive ring.

However, in the conventional light intercepting mechanism as mentioned above, the annular light intercepting member has a certain length in the optical axis direction, and hence the decrease in the axial length of the zoom lens barrel and accordingly the thickness (length in the optical axis direction) of the camera is limited to some extent by the light intercepting member.

In addition, there is no zoom compact camera hitherto known, having a lens hood incorporated therein.

As is well known, a lens hood is adapted to prevent intensive extraneous light out of the angle of view from entering the lens, for example when a picture is taken against the backlight. If the external light enters the lens, lenflare is caused by the internal reflections of the extraneous light within the lens barrel. Consequently, image quality deteriorates.

For instance, a zoom lens for a single lens reflex camera may have a built-in cylindrical lens hood. The cylindrical lens hood is slidably fitted onto the outer peripheral surface of the lens barrel. The lens hood is retracted rearward during storage and is manually advanced forward when the lens is used. The advantages of a lens hood would also benefit a compact camera.

However, it is difficult to apply the above-mentioned structure for a single lens reflex detachable lens to a compact camera in which the lens barrel is entirely accommodated in the camera body. Alternatively, if a separate lens hood is detachably attached to the front end of the lens by means of a bayonet or screw coupling, it is necessary for a photographer to carry a separate lens hood. However, this reduces one of the main attractions of a compact camera, that is portability.

SUMMARY OF THE INVENTION

It is an object of the present invention to provide a zoom lens barrel in which it is possible to prevent extraneous (harmful) light entering through an annular gap between the movable lens frame and the drive ring without using an annular light intercepting member made of paper or tape, etc.

Another object of the present invention is to provide a zoom lens barrel having a lens hood incorporated therein.

According to an aspect of the present invention, there is provided a light intercepting mechanism of a zoom lens barrel having a movable lens frame which holds a frontmost lens group. The movable lens frame has a dual-cylinder structure having a closed front end and an open rear end. A drive ring is fitted on an outer peripheral surface of the movable lens frame to relatively rotate, so that when the relative rotation of the drive ring occurs, the movable lens frame moves in an optical axis direction. The drive ring has a dual-cylinder structure having a closed rear end and an open front end. One of the movable lens frame having the dual-cylinder structure and the drive ring having the dual-cylinder structure is fitted in the other of the movable lens frame having the dual-cylinder structure and the drive ring having the dual-cylinder structure.

The drive ring can be a cam ring which is provided, on the inner peripheral surface of an inner cylinder of the dual-cylinder structure, with a cam groove adapted to drive the frontmost lens group. The frontmost lens group can be provided with a cam follower pin which is engaged in the cam groove of the cam ring, so that the frontmost lens group can be guided to linearly move in the optical axis direction when the cam ring rotates.

According to another aspect of the present invention, there is provided a light intercepting mechanism of a zoom lens barrel having a movable lens frame which holds a frontmost lens group, and a drive ring which is fitted on an outer peripheral surface of the movable lens frame to relatively rotate, so that the movable lens frame can be moved in an optical axis direction in accordance with the relative rotation of the drive ring. The movable lens frame has a dual-cylinder structure having a substantially U-shaped section, having an outer cylinder, an inner cylinder, and a light intercepting wall which connects the outer and inner cylinders at front ends thereof. The drive ring has a dual-cylinder structure having a substantially U-shaped section, having an outer cylinder, an inner cylinder, and a light intercepting wall which connects the outer and inner cylinders at rear ends thereof. One of the movable lens frame having the dual-cylinder structure and the drive ring having the dual-cylinder structure is fitted in the other of the movable lens frame having the dual-cylinder structure and the drive ring having the dual-cylinder structure so that the inner cylinder of the movable lens frame, the inner cylinder of the drive ring, the outer cylinder of the movable lens frame and the outer cylinder of the drive ring are concentrically fitted one inside the other in this order from the inner side.

The drive ring can be provided on the inner peripheral surface of the inner cylinder with a cam groove. The movable lens frame can be provided on the inner cylinder thereof with a radial cam follower which is engaged in the cam groove of the cam ring.

A built-in lens hood can be provided on the outer peripheral surface of the outer cylinder of the movable lens frame of the dual-cylinder structure to slide relative to the outer cylinder. The lens hood can be retracted in and protruded from the annular space between the outer and inner cylinders of the drive ring together with the outer cylinder of the movable lens frame. The built-in lens hood which is capable of moving relative to the movable lens frame can be moved between a light interception position in which the lens hood is advanced most forward and a retracted position in which the lens hood is accommodated in the camera body. The inner space for accommodating the lens hood can be provided by the annular space defined between the inner and outer cylinders of the drive ring, without increasing the size of the lens barrel.

According to another aspect of the present invention, there is provided a camera with a zoom function having a first lens barrel member which is moved in an optical axis direction to retract into or protrude from a camera body. The first lens barrel member is made of a dual-cylinder structure having outer and inner cylinders which are interconnected at rear ends thereof to define an annular space therebetween which is open at a front end and is closed at a rear end. A second lens barrel member is provided which holds a frontmost lens group and which is moved in the optical axis direction to retract into or protrude from the first lens barrel member. A cylindrical lens hood is movably fitted on an outer peripheral surface of the second lens barrel member in the optical axis direction. The second lens barrel member and the lens hood are movable in the annular space of the first lens barrel member.

The second lens barrel member and the lens hood can be substantially entirely retracted in the annular space of the first lens barrel member when the lens hood is moved to its rearmost position on the second lens barrel member and the second lens barrel member is moved to its rearmost position relative to the first lens barrel member.

The first lens barrel member can be substantially entirely retracted in the camera body when the first lens barrel member is moved to its rearmost position relative to the camera body.

In an embodiment, the second lens barrel member is opposed to the first lens barrel member so that the outer and inner peripheral surfaces of the second lens barrel member at the rear end thereof are opposed to the outer peripheral surface of the inner cylinder and the inner peripheral surface of the outer cylinder, of the first lens barrel member, with an extremely small gap therebetween so as to provide a light interception effect.

In an embodiment, the first lens barrel member is, for example, a cam ring for a zoom mechanism.

In an embodiment, the camera is, for example, a compact camera having a lens shutter.

Preferably, the lens hood is fitted to the second lens barrel member to slide with a predetermined friction resistance.

According to still another aspect of the present invention, a compact camera with a zoom function is provided having a camera body, a front lens barrel member which holds a frontmost lens group of a zoom lens and which can be retracted into and protruded from the camera body, and a lens hood which is fitted onto the front lens barrel member so as to move in an optical axis direction. The lens hood being retractable in the camera body together with the front lens barrel member.

The present disclosure relates to subject matter contained in Japanese Patent Application Nos. 8-240273 (filed on Sep. 11, 1996) and 9-110402 (filed on Apr. 10, 1997) which are expressly incorporated herein by reference in their entireties.

BRIEF DESCRIPTION OF THE DRAWINGS

The invention will be discussed below in detail with reference to the accompanying drawings, in which.

DESCRIPTION OF THE PREFERRED EMBODIMENTS

Figure 9:
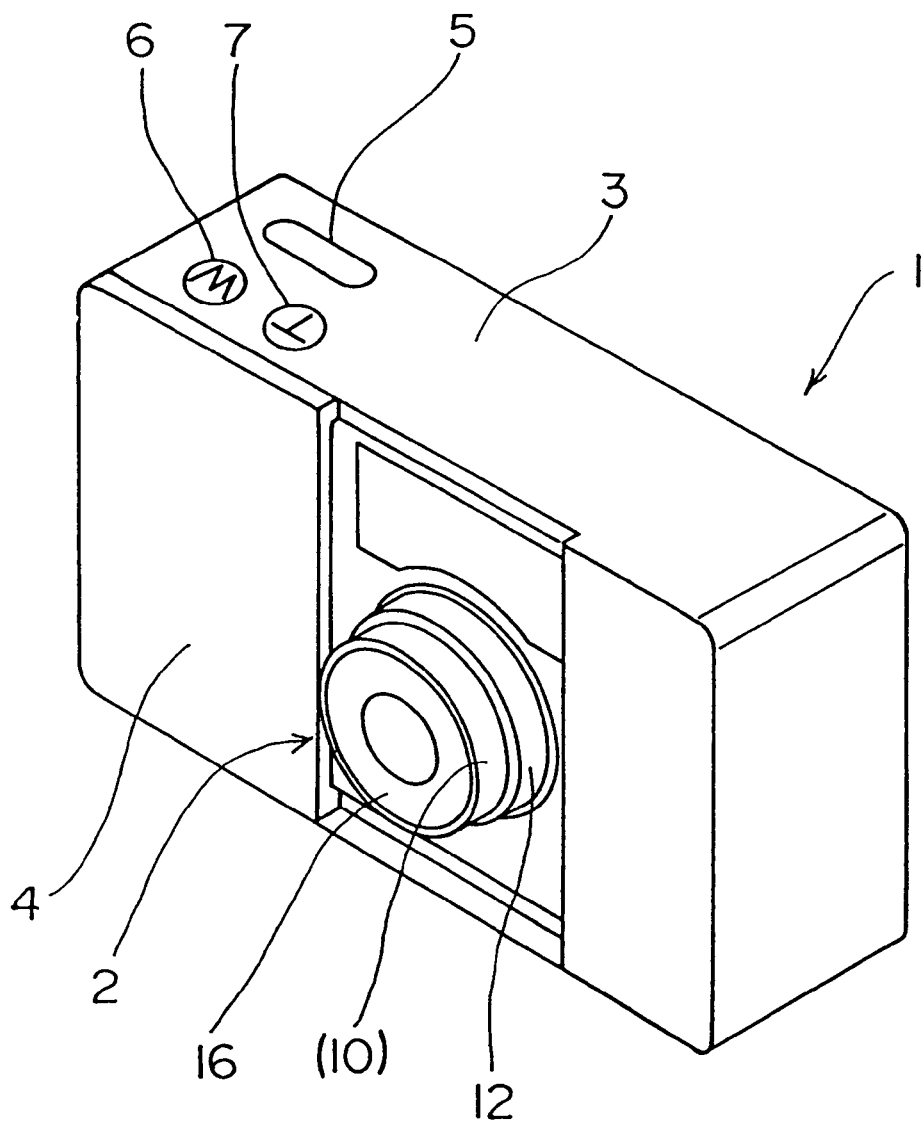
FIG. 9 is a perspective view of a compact camera having a zoom lens barrel according to the present invention.

As shown in FIG. 9, a compact camera 1 provided with a lens shutter has a lens barrel 2 which can be entirely retracted into a camera body 3 of the compact camera 1. The camera body 3 is provided on the front surface thereof with a sliding barrier 4 which can slide laterally. The camera body 3 is provided on the upper surface thereof with a release button 5, a wide-switch button 6 and a tele-switch button 7.

When the camera 1 is not used, the lens barrel 2 is covered by the sliding barrier 4 to protect the lens. In this state, the lens barrel 2 is entirely retracted in the camera body 3.

When the camera 1 is used, the sliding barrier 4 is laterally slid, so that a switch circuit (not shown) is closed to drive a zoom motor which will be discussed hereinafter. Consequently, the lens barrel 2 is advanced to project forwardly, so that a widest position is established, as shown in FIG. 9.

As shown in FIGS. 1–3a first lens barrel member 12 is retracted into and protrudes from the camera body 3 in accordance with the movement of the lens barrel 2 in the optical axis direction. A second lens barrel member 16 holds a front lens group L1 (the frontmost lens) group of the zoom lens and moves in the optical axis direction relative to the first lens barrel member 12.

In the illustrated embodiment, the first lens barrel member 12 forms a cam ring (drive ring) of a zoom mechanism and is hereinafter referred to as a cam ring. The second lens barrel member 16 is hereinafter referred to as a movable lens frame, or a front lens barrel member.

FIGS. 1 through 4 show a first embodiment of a zoom lens barrel according to the present invention.

As shown in FIGS. 1–3a stationary ring 11 integral with the camera body 3 is provided on the inner peripheral surface thereof with a female helicoid (internal thread) 11a which is in mesh with a male helicoid (external thread) 12a formed at the rear end of the cam ring (drive ring or first lens barrel member) 12. The cam ring 12 is fitted in the stationary ring 11, and is provided with a spur gear 12b that is formed on a partly cut-away portion of the male helicoid 12a. The spur gear 12b engages with a zoom drive gear 13 that is rotatably supported by the stationary ring 11. The zoom drive gear 13 is driven by a zoom motor (not shown). When the zoom drive gear 13 is driven, the cam ring 12 is moved in the optical axis direction in accordance with the engagement of the male helicoid 12a and the female helicoid 11a.

Figure 3:
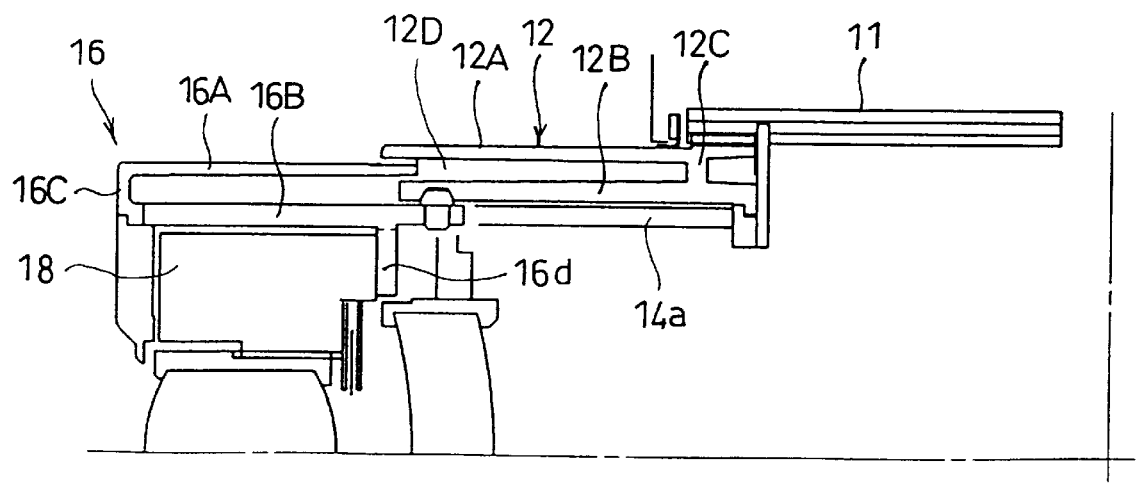
FIG. 3 is a sectional view of an upper half of a zoom lens barrel at a longest focal length, according to the first embodiment of the present invention.

The cam ring 12 has a dual-cylinder structure, which is substantially U-shaped in a longitudinal section, having an outer cylinder 12A and an inner cylinder 12B. The rear end of the cam ring 12 is closed by a radially extending light intercepting wall 12C and is open at the front end. In other words, as shown in FIG. 3, an annular space 12D which is closed at the rear end and open at the front end is defined between the outer and inner cylinders 12A and 12B and the radial wall 12C. The inner cylinder 12B is provided on the inner peripheral surface thereof with cam grooves 12d and 12e for the front and rear lens groups L1 and L2, respectively.

Figure 2:
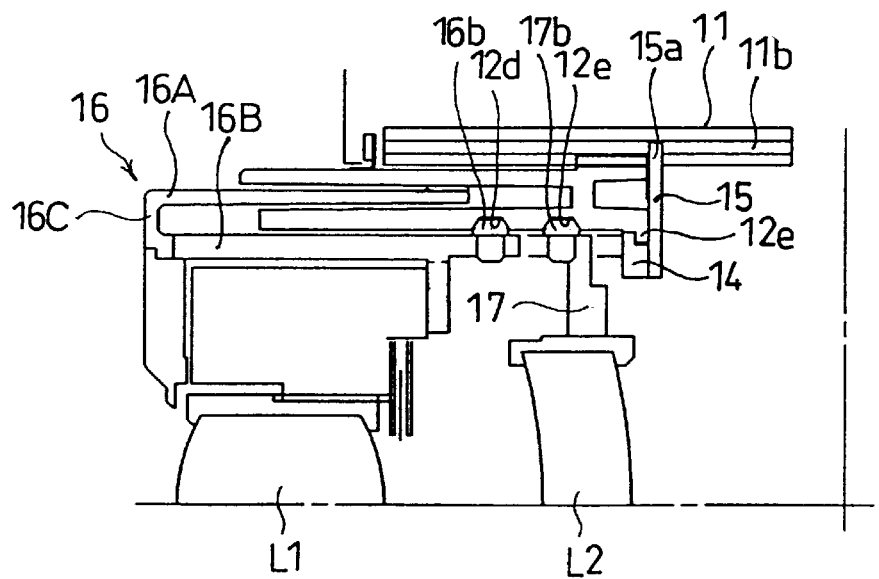
FIG. 2 is a sectional view of an upper half of a zoom lens barrel at an intermediate focal length, according to the first embodiment of the present invention.
Figure 4:
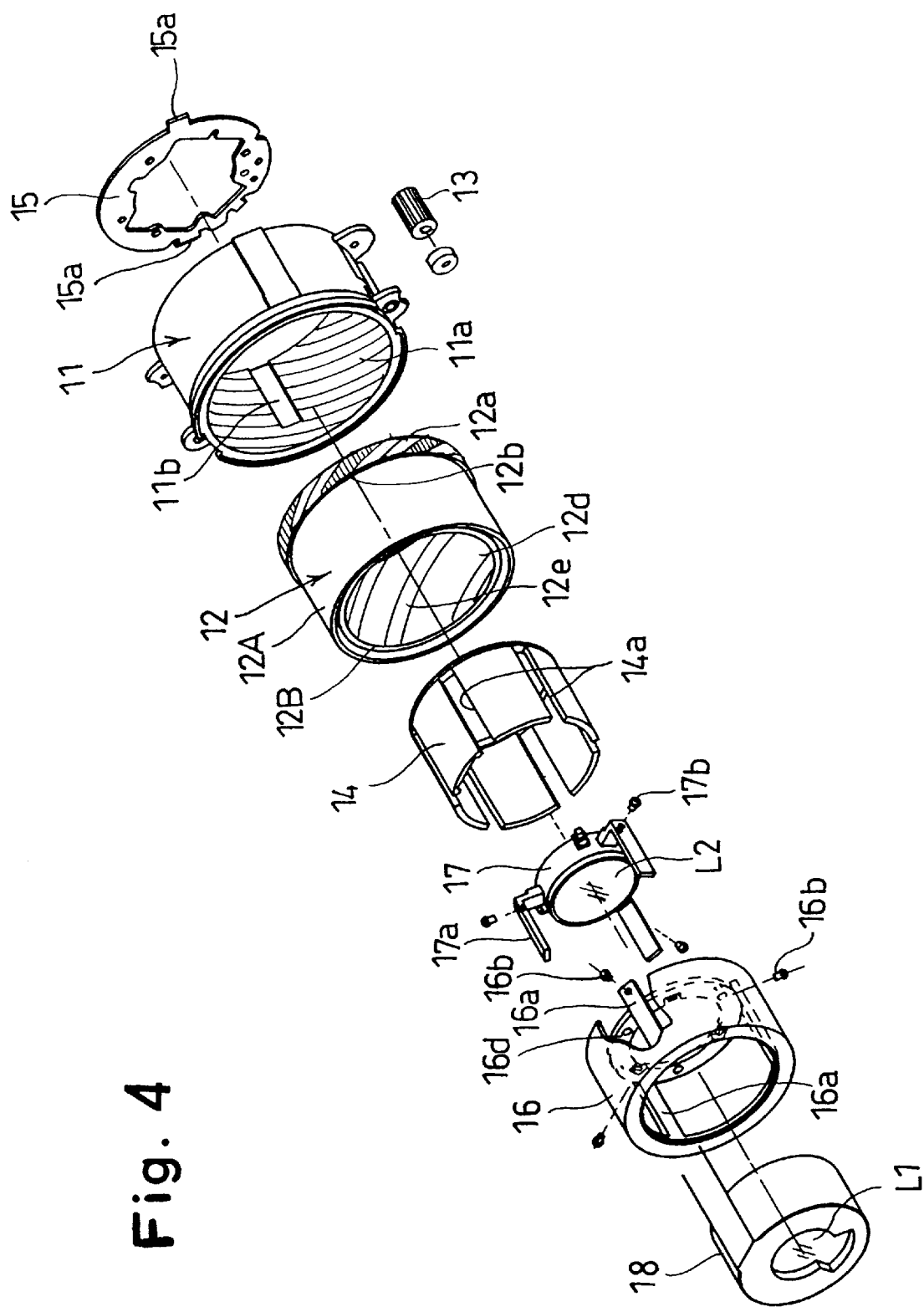
FIG. 4 is an exploded perspective view of a zoom lens barrel according to the first embodiment of the present invention.

As shown in FIGS. 2 and 4, a linear movement guide ring 14 is fitted in the cam ring 12, such that a rear end of the linear movement guide ring 14 protrudes from the cam ring 12. A linear movement guide plate 15 is secured to the rear end of the linear movement guide ring 14. An inner flange 12f formed at the rear end of the cam ring 12 is rotatably supported between the linear movement guide plate 15 and the linear movement guide ring 14, so that the linear movement guide ring 14 and the cam ring 12 can relatively rotate but move together in the optical axis direction. The linear movement guide plate is provided with radial projections 15a which are fitted in linear movement guide grooves 11b. The guide grooves 11b are formed on the inner peripheral surface of the stationary ring 11 and extend in parallel with the optical axis.

As shown in FIG. 3 and, the linear movement guide ring 14 is provided with linear movement guide legs 14a extending parallel to the optical axis, so that a movable lens frame (front lens barrel member or second lens barrel member) 16, which holds the front lens group L1, and a rear lens frame 17, which holds the rear lens group L2, are linearly guided and moved through the linear movement guide legs 14a, respectively. Specifically, the movable lens frame 16 is provided with linear movement guide projections 16a which engage the linear movement guide legs 14a, and the rear lens frame 17 is provided with linear movement guide projections 17a which engage another set of linear movement guide legs 14a. The linear movement guide projections 17a are provided with radially extending cam follower pins 17b which are engaged in the cam grooves 12e of the cam ring 12.

Figure 1:
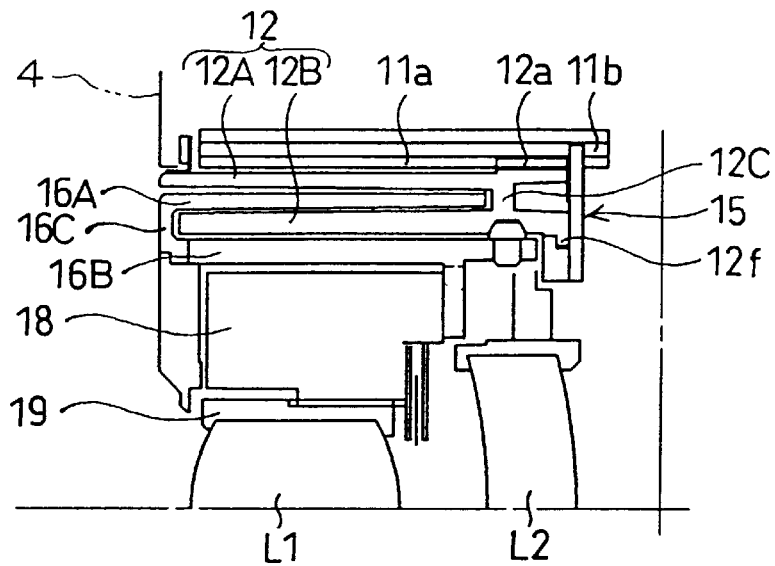
FIG. 1 is a sectional view of an upper half of a zoom lens barrel shown in a retracted position, according to a first embodiment of the present invention.

As shown in FIGS. 1–3, the movable lens frame 16 has a dual-cylinder structure that is substantially U-shaped in a longitudinal section, having an outer cylinder 16A and an inner cylinder 16B. The front end of the movable lens frame 16 is closed by a radially extending light intercepting wall 16C, and is open at the rear end. The movable lens frame 16, having the dual-cylinder structure, is fitted in the cam ring 12, also having the dual-cylinder structure. Namely, the inner cylinder 16B of the movable lens frame 16, the inner cylinder 12B of the cam ring 12, the outer cylinder 16A of the movable lens frame 16, and the outer cylinder 12A of the cam ring 12 are concentrically arranged in this order from the inner side (optical axis). As shown in FIG. 4, the linear movement guide projections 16a extend along, and on the inner peripheral surface of, the inner cylinder 16B of the movable lens frame 16, and project at the rear ends thereof from the inner cylinder 16B. The projections 16a are provided, on the rear ends thereof projecting outward from the inner cylinder 16B, with cam follower pins 16b that engage in the cam grooves 12d of the cam ring 12.

As shown in FIG. 4, the movable lens frame 16 is provided with a shutter unit mounting ring 16d integral therewith, to which an annular shutter unit 18 is secured. The annular shutter unit 18 is screw-engaged and secured to a front lens frame 19, at the center portion thereof, as noted the front lens frame 19 (holds the front lens group L1). The shutter unit 18 rotates the front lens frame 19 (front lens group L1) in accordance with object distance data to thereby move the same in the optical axis direction through the screw-engagement therebetween, and opens and closes shutter blades in accordance with object brightness data, as is well known in the art.

The zoom lens barrel constructed as above operates as follows.

When the camera 1 is not in use, the zoom lens barrel 2 is retracted in the camera body 3 (and the sliding barrier 4 is closed) as shown in FIG. 1. When the camera 1 is used, the sliding barrier 4 is opened, (starting the zoom motor) so that the cam ring 12 is rotated, for example, in the forward direction by the zoom motor (not shown) until the cam ring 12 is stopped at the wide-position at which a picture can be taken (as shown in FIG. 2). In this state, if the tele-switch button 7 (or the wide-switch button 6, e.g., after the tele-switch button 7 has been operated) is depressed to drive the zoom motor in the forward (or reverse direction) to thereby rotate the zoom drive gear 13 in the same direction, the cam ring 12 is rotated in the forward (or reverse direction) and is moved in the optical axis direction while rotating. As shown in FIG. 4, the inner cylinder 12B of the cam ring 12 is provided on the inner peripheral surface thereof with the cam grooves 12d and 12e, in which the cam follower pins 16b and 17b of the movable lens frame 16 and the rear lens frame 17 are engaged, respectively. Since the movable lens frame 16 and the rear lens frame 17 are guided to move linearly in the optical axis direction by the linear movement guide projections 16a and 17a, respectively, in combination with the linear movement guide plate 15, the linear movement guide ring 14, the linear movement guide legs 14a, the rotation of the cam ring 12 causes the movable lens frame 16 (front lens group L1) and the rear lens frame 17 (rear lens group L2) to move in the optical axis direction in accordance with the cam profile of the cam grooves 12d and 12e. Thus, the zooming operation is carried out.

As shown in FIGS. 2 and 3, during the zooming operation, the movable lens frame 16 linearly moves in the optical axis direction relative to the cam ring 12, which is moved in the optical axis direction while rotating. Namely, the cam ring 12 and the movable lens frame 16 are moved between the retracted position (shortest focal length position or "wide extremity") shown in FIG. 2 and the most advanced position (longest focal length position or telephoto extremity) shown in FIG. 3. During the movement of the cam ring 12 in the optical axis direction, the movable lens frame 16 is moved in the optical axis direction by a displacement larger than that of the cam ring 12.

In the retracted position (accommodated position) shown in FIG. 1, the inner cylinder 12B of the cam ring 12 is fully received in the annular space between the gouter and inner cylinders 16A and 16B of the movable lens frame 16, and the outer cylinder 16A of the movable lens frame 16 is fully received in the annular space 12D between the outer and inner cylinders 12A and 12B of the cam ring 12. As the lens is moved from the retracted position shown in FIG. 1 to the longest focal length position shown in FIG. 3, the insertion depth (amount of overlap) of the inner cylinder 12B or the outer cylinder 16A is gradually reduced. In any position, however, the outer and inner cylinders 16A and 16B and the light intercepting wall 16C of the movable lens frame 16, incombination with the outer and inner cylinders 12A and 12B and the light intercepting wall 12C of the cam ring 12, define a labyrinth which does not permit extraneous (harmful) light to pass therethrough. Thus, no extraneous light enters the camera body 3 through the annular gap between the cam ring 12 and the movable lens frame 16.

FIGS. 5 through 8 show a second embodiment of the present invention. The second embodiment differs from the first embodiment in that a lens hood 10 is supported on the outer peripheral surface of the outer cylinder 16A of the front lens barrel member (movable lens frame or first lens barrel member) 16 to move in the optical axis direction, and in that the lens hood 10 is inserted in the annular gap 12D between the outer and inner cylinders 12A and 12B of the cam ring (second lens barrel member) 12.

Figure 5:
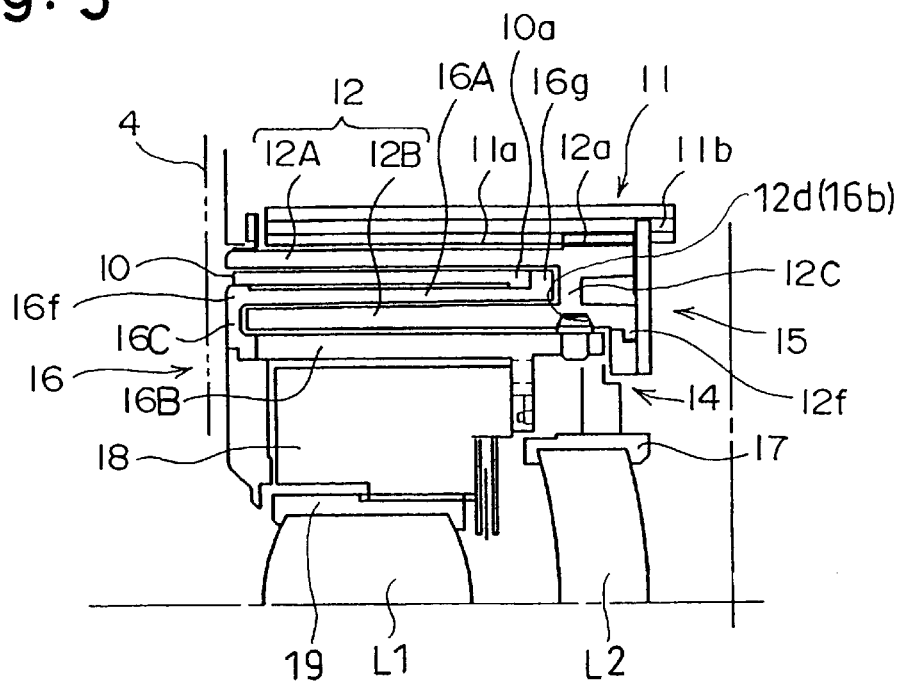
FIG. 5 is a sectional view of an upper half of a zoom lens barrel shown in a retracted position, according to a second embodiment of the present invention.
Figure 6:
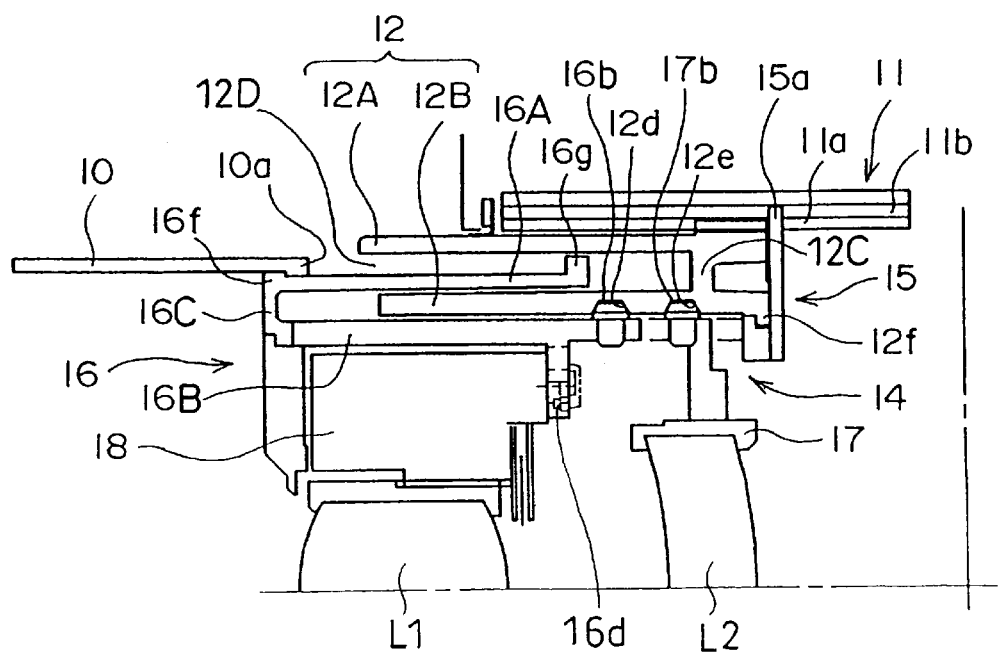
FIG. 6 is a sectional view of an upper half of a zoom lens barrel at an intermediate focal length, according to the second embodiment of the present invention.
Figure 7:
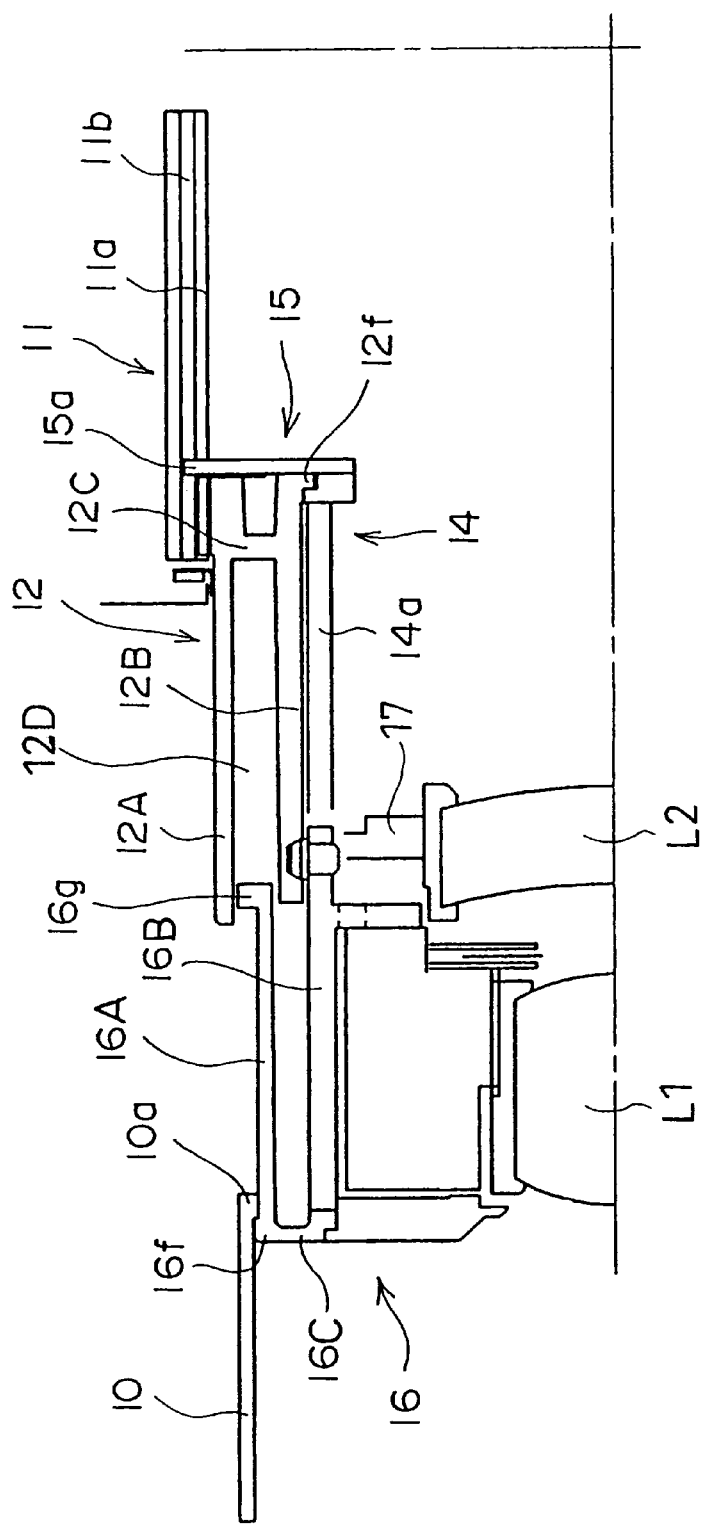
FIG. 7 is a sectional view of an upper half of a zoom lens barrel at a longest focal length, according to the second embodiment of the present invention.

As shown in FIGS. 5–7, the lens hood 10 has a cylinder shape and is provided on its rear end with an inner flange 10a. The inner flange 10a is fitted on the outer peripheral surface of the movable lens frame 16. The lens hood 10 can be manually moved (i.e., by hand) relative to the movable lens frame 16 in the optical axis direction. The contact surface of the inner flange 10a of the lens hood 10 with the movable lens frame 16 is felted, so that the lens hood 10 slides along the movable lens frame 16 with a slight (predetermined) friction resistance therebetween.

The movable lens frame 16 is provided, on the outer peripheral surface thereof at the front and rear ends, with outer flanges 16f and 16g, respectively, which serve as a stopper. That is, when the inner flange 10a of the lens hood 10 abuts the outer flanges 16f and 16g, the lens hood 10 is stopped and prevented from slipping off the movable lens frame 16. Thus, the lens hood 10 is provided on the camera 1 as a built-in lens hood.

Figure 8:
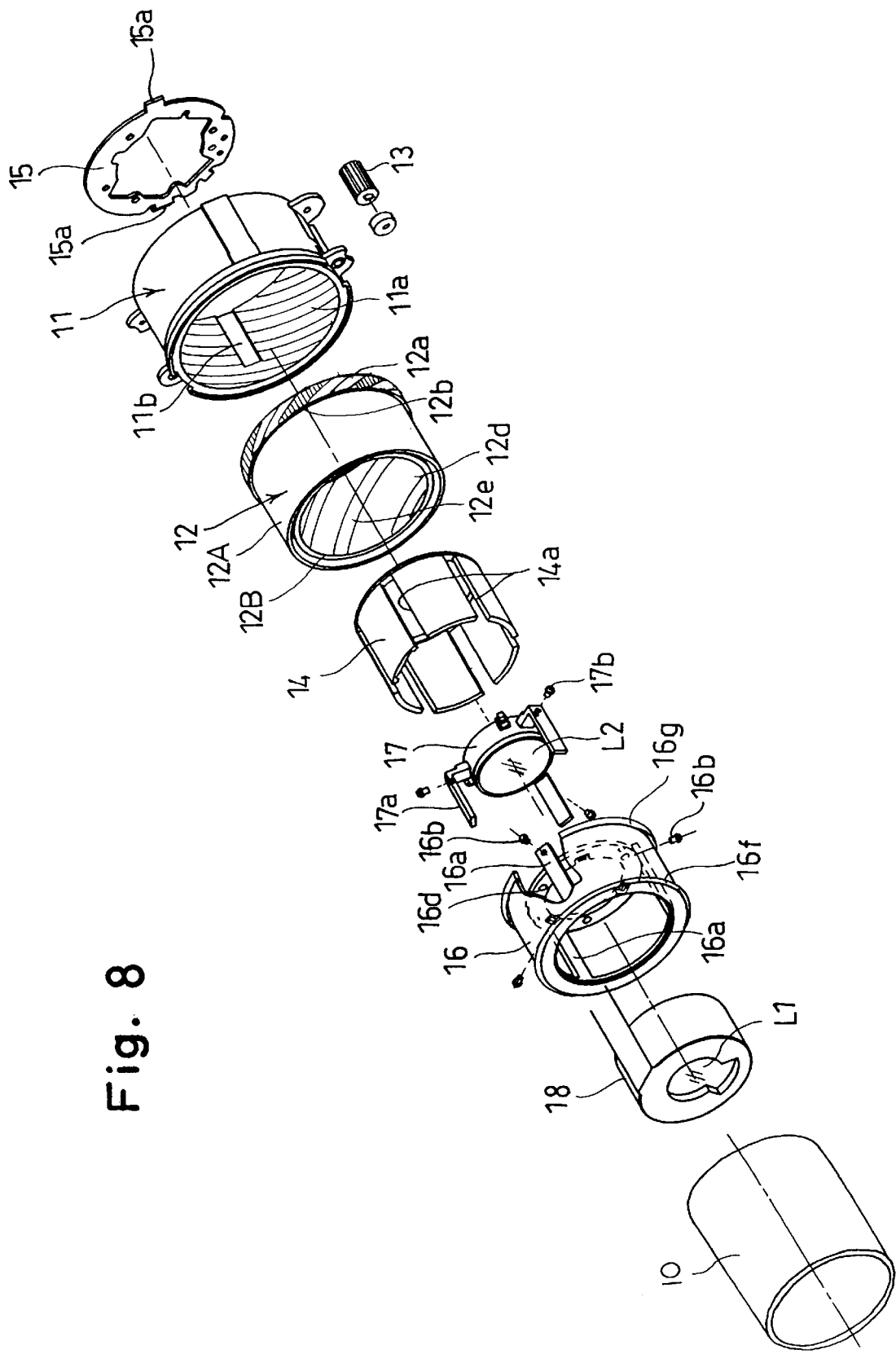
FIG. 8 is an exploded perspective view of a zoom lens barrel according to the second embodiment of the present invention.

To fit the lens hood 10 onto the outer peripheral surface of the movable lens frame 16, the lens hood 10 is split into two hood elements, (not shown) each having a semi-circular cross-section in the longitudinal direction, so that the hood elements can be connected to form the cylindrical lens hood after the hood elements are fitted onto the outer peripheral surface of the movable lens frame 16. Alternatively, as shown in FIG. 8, it is possible to make the lens hood from a flexible or expandable plastic material, so that the lens hood can be press-fitted onto the outer peripheral surface of the movable lens frame 16 from the front side thereof while expanding the inner flange 10a so as to ride over the outer flange 16f. Moreover, it is also possible to make one of the outer flanges 16f and 16g as a piece separate from the movable lens frame 16. In this alternative, the separate outer flange 16f or 16g is attached to the movable lens frame 16 after the lens hood 10 has been fitted onto the outer peripheral surface of the movable lens frame 16.

As shown in FIG. 8 the outer flange 16g at the rear end of the movable lens frame 16 serves not only as a stopper as mentioned above, but also, as shown in FIGS. 6 and 7, as a light intercepting member to prevent extraneous (harmful) light from entering the camera 1 through the gap between the cam ring 12 and the movable lens frame 16. That is, the height of the outer flange 16g is set such that the outer and inner peripheral surfaces of the movable lens frame 16 at the rear end thereof oppose the inner peripheral surface of the outer cylinder 12A of the cam ring 12, respectively and the outer peripheral surface of the inner cylinder 12B of the cam ring 12 with a slight gap (extremely small gap) therebetween. With this structure, a labyrinth effect is provided between the cam ring 12 and the movable lens frame 16, and effective light interception can be obtained without providing an annular light intercepting member in the form of paper, felt, cloth or plastic on the cam ring 12 or on the movable lens frame 16.

With this light intercepting structure, since no light intercepting member which exerts a strong frictional force on the cam ring 12 or the movable lens frame 16 is used, there is little friction between the cam ring 12 and the movable lens frame 16. Consequently, a smaller zoom motor and a battery having less capacity can be used, thus leading to miniaturization of the camera.

The lens hood 10 can be held by a photographer's fingertips and manually moved forwardly when required, once the front end of the movable lens frame 16 protrudes from the front end of the cam ring 12, as shown in FIG. 9. In FIGS. 6 and 7, the lens hood 10 is advanced to the frontmost position, i.e., the lens hood 10 is moved farthest from the movable lens frame 16.

As shown in FIGS. 6 and 7 if the lens hood 10 is held at the retracted position (where the inner flange 10a of the lens hood 10 abuts the outer flange 16g of the movable lens frame 16), the lens hood 10 is moved together with the movable lens frame 16 when the lens frame 16 moves from the retracted position to the wide-extremity or the tele-extremity. When the lens hood 10 is moved rearwardly from the telephoto-extremity side to the wide-extremity side or the retracted position, the movable lens frame 16 is also moved together with the lens hood 10, due to the frictional force produced between the inner flange 10a of the lens hood 10 and the outer peripheral surface of the movable lens frame 16 by the provided felt (on the inner flange 10a or the outer peripheral surface of the movable lens frame 16). Therefore, the lens hood 10 is moved together with the movable lens frame 16 while keeping the inner flange 10a in contact with the outer flange 16g, and the lens hood 10 is therefore not obstructive when not in use.

For a telephoto-shot, it is preferable that the lens hood 10 be relatively long. However, the length of the lens hood 10 is determined by taking into account that no vignetting should occur during a wide-angle shot.

The lens hood 10 can be easily retracted into the camera body 3 by the photographer pushing the same with the finger or palm.

As shown in FIGS. 5–7 in the second embodiment mentioned above, since the outer cylinder 16A of the movable lens frame 16 and the lens hood 10 fitted on the outer peripheral surface of the outer cylinder 16A are inserted and moved in the annular space 12D defined between the outer and inner cylinders 12A and 12B of the cam ring 12, a built-in lens hood can be easily realized for, e.g., a compact camera having a zoom function in which the lens barrel 2 is entirely accommodated or retracted in the camera body 3. In the prior art, it has been very difficult to incorporate the lens hood in such a type of compact zoom camera.

Consequently, it is not necessary for a photographer to carry the lens hood separate from the camera body, while the image quality is enhanced by the provided lens hood without sacrificing the portability of the camera.

Moreover, in the second embodiment, since light interception is ensured between the cam ring 12 and the movable lens frame 16 without using a conventional annular light intercepting member (which inevitably produces a frictional force therebetween), not only can a small zoom motor be used, but also a battery having less capacity can be used. This contributes to a decrease in the size of the compact camera.

It should be noted that camera having a lens shutter requires a higher light interception capability than a camera having a focal-plane shutter. Since the light interception mechanism of the present invention of the two embodiments of FIGS. 1–4 and 5–8 can be applied to a lens shutter type camera, the present invention is particularly useful for a lens shutter type compact camera. However, the application of the present invention is not limited to a compact camera. The present invention can be generally applied to any type of camera.

Although the first lens barrel member is in the form of a cam ring in the illustrated embodiments, the first lens barrel member is not limited to the cam ring. Namely, the first lens barrel member can be any member which defines an annular space closed at the rear end and open at the front end when the cylinder of the movable lens frame and the lens hood are moved in the optical axis direction.

Although the above discussion has been directed to a two-lens group type zoom lens, the present invention can be applied to a zoom lens barrel having more than two lens groups. The basic concept of the present invention resides in the provision of a light intercepting mechanism between the movable lens frame which holds the frontmost lens group, and the drive ring in which the movable lens frame is fitted to rotate relative to the movable lens frame. Accordingly, elements located behind the movable lens frame and the drive ring do not participate in the arrangement.

As can be seen from the above discussion, according to the present invention of the embodiments of FIGS. 1–4, in a zoom lens barrel having a movable lens frame which holds a frontmost lens group and a drive ring in which the movable lens frame is fitted to rotate relative to the movable lens frame (so that the movable lens frame can be moved in the optical axis direction by the relative rotation between the movable lens frame and the drive ring), it is possible to prevent extraneous (harmful) light from entering the lens barrel by the dual-cylinder structures of the movable lens frame and the drive ring. Moreover, this is accomplished without using a light intercepting member in the form of paper or tape, etc.

Still further, according to the present invention of the embodiments of FIGS. 5–8, it is possible to provide a built-in lens hood in a camera such as a compact zoom camera in which the lens barrel is entirely accommodated or retracted in the camera body. In the prior art, no such compact zoom camera having a built-in lens hood exists. Therefore, it is unnecessary for a photographer to carry the lens hood separate from the camera body, while the image quality can be enhanced by the lens hood without sacrificing the portability of the camera.

What is claimed is:

1. A light intercepting mechanism of a zoom lens barrel, comprising:

a movable lens frame which holds a frontmost lens group; and a drive ring which is fitted on an outer peripheral surface of said movable lens frame to relatively rotate, so that said movable lens frame can be moved in an optical axis direction in accordance with said relative rotation of said drive ring, said movable lens frame having a dual-cylinder structure with a substantially U-shaped cross-section, having an outer cylinder, an inner cylinder, and a light intercepting wall which connects said outer and inner cylinders at front ends thereof, said drive ring having a dual-cylinder structure with a substantially U-shaped cross-section, having an outer cylinder, an inner cylinder, and a light intercepting wall which connects said outer and inner cylinders at rear ends thereof, one of said movable lens frame and said drive ring being fitted in a remaining one of said movable lens frame and said drive ring, so that said inner cylinder of said movable lens frame, said inner cylinder of said drive ring, said outer cylinder of said movable lens frame and said outer cylinder of said drive ring are concentrically fitted one inside the other, in the recited order from the inner side, wherein said drive ring is provided on an inner peripheral surface of said inner cylinder with a cam groove, and wherein said movable lens frame is provided on said inner cylinder thereof with a radial cam follower which engages said cam groove of said cam ring.

2. A light intercepting mechanism of a zoom lens barrel, comprising:

a movable lens frame which holds a frontmost lens group, said movable lens frame having a dual-cylinder structure having a closed front end and an open rear end;

a drive ring which is fitted on an outer peripheral surface of said movable lens frame to relatively rotate, so that when said relative rotation of said drive ring occurs, said movable lens frame moves in an optical axis direction, said drive ring having a dual-cylinder structure having a closed rear end and an open front end, wherein one of said movable lens frame and said drive ring is fitted in a remaining one of said movable lens frame and said drive ring; and a cylindrical lens hood that is movably fitted on said outer peripheral surface of an outer cylinder of said movable lens frame to move in said optical axis direction, wherein said cylindrical lens hood on said outer cylinder of said movable lens frame is movable within an annular space defined between said inner and outer cylinders of said drive ring.

3. A camera with a zoom function, comprising:

a camera body;

a first lens barrel member which is moved in an optical axis direction to retract into or protrude from said camera body, said first lens barrel member having a dual-cylinder structure with outer and inner cylinders which are interconnected at rear ends thereof to define an annular space therebetween which is open at a front end and is closed at a rear end;

a second lens barrel member which holds a frontmost lens group and which is moved in said optical axis direction to retract into or protrude from said first lens barrel member; and a cylindrical lens hood that is movably fitted on an outer peripheral surface of said second lens barrel member to move in said optical axis direction, wherein both of said second lens barrel member and said lens hood are movable in said annular space of said first lens barrel member.

4. A camera with a zoom function according to claim 3, wherein said lens hood is fitted on said second lens barrel member such that said lens hood is moved together with said second lens barrel when said second lens barrel member is moved in said optical axis direction.

5. A camera with a zoom function according to claim 3, wherein said second lens barrel member and said lens hood are substantially entirely retracted in said annular space of said first lens barrel member when said lens hood is moved to its rearmost position on said second lens barrel member and said second lens barrel member is moved to its rearmost position relative to said first lens barrel member.

6. A camera with a zoom function according to claim 5, wherein said first lens barrel member is substantially entirely retracted in said camera body when said first lens barrel member is moved to its rearmost position relative to said camera body.

7. A camera with a zoom function according to claim 3, wherein said second lens barrel member fits within said first lens barrel member so that said outer and inner peripheral surfaces of said second lens barrel member at said rear end thereof oppose said outer peripheral surface of said inner cylinder and said inner peripheral surface of said outer cylinder of said first lens barrel member, with a small gap therebetween, forming a labyrinth that intercepts extraneous light.

8. A camera with a zoom function according to claim 3, wherein said first lens barrel member comprises a cam ring, said cam ring driving a zoom function of a zoom lens system, which includes said frontmost lens group, by rotation of said cam ring.

9. A camera with a zoom function according to claim 3, wherein said camera is a compact camera having a lens shutter.

10. A camera with a zoom function according to claim 3, wherein said lens hood is fitted onto said second lens barrel member to slide with a predetermined friction resistance.

* * * * *